US012134842B2

(12) United States Patent
Lim et al.

(10) Patent No.: US 12,134,842 B2
(45) Date of Patent: Nov. 5, 2024

(54) YARN FOR TIRE CORD AND TIRE CORD

(71) Applicants: KOLON INDUSTRIES, INC., Seoul (KR); CONTINENTAL REIFEN DEUTSCHLAND GMBH, Hannover (DE)

(72) Inventors: Ki Sub Lim, Seoul (KR); Il Chung, Seoul (KR); Sung Ho Park, Seoul (KR); Nermeen Nabih, Hannover (DE); Michael Schunack, Hannover (DE); Thomas Kramer, Seoul (KR)

(73) Assignees: KOLON INDUSTRIES, INC., Seoul (KR); CONTINENTAL REIFEN DEUTSCHLAND GMBH, Hannover (DE)

(*) Notice: Subject to any disclaimer, the term of this patent is extended or adjusted under 35 U.S.C. 154(b) by 450 days.

(21) Appl. No.: 17/624,385

(22) PCT Filed: Jul. 3, 2020

(86) PCT No.: PCT/KR2020/008738
§ 371 (c)(1),
(2) Date: Jan. 3, 2022

(87) PCT Pub. No.: WO2021/006561
PCT Pub. Date: Jan. 14, 2021

(65) Prior Publication Data
US 2022/0349094 A1 Nov. 3, 2022

(30) Foreign Application Priority Data

Jul. 5, 2019 (KR) .................. 10-2019-0081578
Jul. 3, 2020 (KR) .................. 10-2020-0082062

(51) Int. Cl.
*D02G 3/48* (2006.01)
*B60C 9/00* (2006.01)
*D01D 5/08* (2006.01)
*D01F 6/92* (2006.01)
*D01F 8/14* (2006.01)

(52) U.S. Cl.
CPC .............. *D02G 3/48* (2013.01); *B60C 9/00* (2013.01); *D01D 5/08* (2013.01); *D01F 6/92* (2013.01); *D01F 8/14* (2013.01)

(58) Field of Classification Search
CPC ........ D02G 3/48; D10B 2331/04; B60C 9/00; D01F 6/92; D01F 8/14; D01D 5/08; C08F 18/14–18/18; C08F 299/026; C08F 2500/02; C08F 2500/12; C08F 2500/17; C08F 2500/19; C08F 2500/03–2500/04; C08F 2500/34; C08L 31/08; C08L 2203/12; C08L 2205/02; Y10T 428/29
See application file for complete search history.

(56) References Cited

U.S. PATENT DOCUMENTS

| | | | | |
|---|---|---|---|---|
| 6,329,053 B2* | 12/2001 | Kim | .......... | D02G 3/48 |
| | | | | 428/364 |
| 2006/0051575 A1* | 3/2006 | Yoon | .......... | D01F 6/78 |
| | | | | 428/364 |
| 2009/0208381 A1* | 8/2009 | Streng | .......... | B01F 35/2214 |
| | | | | 422/134 |
| 2017/0121522 A1 | 5/2017 | Booth et al. | | |
| 2020/0190319 A1* | 6/2020 | Fan | .......... | D01F 6/84 |

FOREIGN PATENT DOCUMENTS

| | | | | | |
|---|---|---|---|---|---|
| CN | 1673426 | A * | 9/2005 | ............. | D01D 10/02 |
| CN | 1717510 | A * | 1/2006 | ............. | D01F 6/78 |
| CN | 101680134 | A | 3/2010 | | |
| CN | 104141178 | A * | 11/2014 | | |
| CN | 105155008 | A | 12/2015 | | |
| DE | 1803435 | A1 | 6/1969 | | |
| GB | 1088416 | A * | 10/1967 | ............. | C08G 63/88 |
| JP | S56-000330 | A | 1/1981 | | |
| JP | S58-076521 | A | 5/1983 | | |
| JP | H04-257316 | A | 9/1992 | | |
| JP | H05-78915 | A | 3/1993 | | |
| JP | H05-125608 | A | 5/1993 | | |
| JP | H11-236493 | A | 8/1999 | | |
| JP | 2000170026 | A * | 6/2000 | | |
| JP | 2007-204741 | A | 8/2007 | | |
| JP | 2017-053060 | A | 3/2017 | | |
| KR | 2011-0124440 | A | 11/2011 | | |
| KR | 2015-0109731 | A | 10/2015 | | |
| KR | 2018-0079533 | A | 7/2018 | | |
| WO | WO-2013-118785 | A1 | 8/2013 | | |
| WO | WO-2021-006561 | A1 | 1/2021 | | |

OTHER PUBLICATIONS

Machine Translation of CN104141178 (Year: 2014).*
Machine Translation of JP2000170026 (Year: 2000).*
Ziabicki, Andrzej; "Effects of Molecular Weight on Melt Spinning and Mechanical Properties on High Performance Poly(ethylene Terephthalate) Fibers"; Polish Academy of Sciences, Institute of Fundamental Technological Research, Warsaw, Poland; Textile Research Journal 66(11), 705-712 (Year: 1996).*
Machine Translation CN1673426 (Year: 2005).*
Supplementary European Search Report from corresponding European Patent Application No. 19957885.7, Dated Jun. 9, 2023.

(Continued)

*Primary Examiner* — Jennifer A Steele

(74) *Attorney, Agent, or Firm* — Harness, Dickey & Pierce, P.L.C.

(57) ABSTRACT

This invention relates to high tenacity yarn for a tire cord comprising polyethyleneterephthalate multifilament obtained by melting and spinning a resin composition comprising first polyethyleneterephthalate and second polyethyleneterephthalate having different intrinsic viscosities, and a method for preparing the same.

14 Claims, No Drawings

(56) References Cited

OTHER PUBLICATIONS

International Search Report from corresponding PCT Application No. PCT/KR2020/008738, dated Oct. 23, 2020.

* cited by examiner

YARN FOR TIRE CORD AND TIRE CORD

CROSS-REFERENCE TO RELATED APPLICATIONS

This application is a national phase application of PCT Application No. PCT/KR2020/008738, filed on Jul. 3, 2020, which claims the benefit and priority to Korean Patent Application Nos. 10-2019-0081578, filed on Jul. 5, 2019 and 10-2020-0082062, filed on Jul. 3, 2020. The entire disclosures of the applications identified in this paragraph are incorporated herein by references.

TECHNICAL FIELD

This invention relates to yarn for a tire cord, a method for preparing the same, and a tire cord.

BACKGROUND

A tire cord is reinforcing material made of fiber that is inserted inside rubber so as to increase life, safety, ride comfort of an automobile tire. Previously, tire cords made by weaving cotton yarn were known, but they are sensitive to friction, and thus, in order to overcome such a limitation, various materials have been developed, and currently, tire cords such as rayon, nylon, polyester, and the like or tire cords made of steel are being used.

Polyester fiber used as a tire cord is prepared by a method of melt spinning polymer resin chips obtained through solid phase polymerization, and the like. Wherein, in order to manifest fiber tenacity required in a tire cord, ultrahigh molecular weight polymer having higher molecular weight is used, and in case such ultrahigh molecular weight polymer is used, a shear rate or process temperature should necessarily be increased so as to increase melt flowability. However, in this case, a part of main chains of polyester are thermally decomposed, and thus, the molecular weight of fiber itself or other properties may be significantly deteriorated, and overstrain is continuously generated in a spinning device, and thus, efficiency of the preparation process may be lowered, or tenacity of prepared polyester fiber may not be improved as much as desired.

SUMMARY

Technical Problem

It is on object of the invention to provide yarn for a tire cord wherein melt viscosity change according to shear rate change is not large, which exhibits excellent formability, and yet, can realize relatively high molecular weight and tenacity.

It is another object of the invention to provide a method for preparing the yarn for a tire cord.

It is yet another object of the invention to provide a tire cord manufactured from the yarn for a tire cord.

Technical Solution

There is provided herein yarn for a tire cord comprising: polyethyleneterephthalate multifilament obtained by melting and spinning a resin composition comprising first polyethyleneterephthalate and second polyethyleneterephthalate having different intrinsic viscosities, wherein the yarn for a tire cord has weight average molecular weight of 90,000 g/mol or more and polydispersity index of 1.9 to 2.3, and has tenacity of 8.0 gf/d or more, or 10.00 gf/d or more.

There is also provided herein a tire cord manufactured from the yarn for a tire cord.

There is also provided herein an automobile tire comprising the tire cord manufactured from the yarn for a tire cord.

There is also provided herein a method for preparing the yarn for a tire cord.

According to one embodiment of the invention, there is provided yarn for a tire cord comprising: polyethyleneterephthalate multifilament obtained by melting and spinning a resin composition comprising first polyethyleneterephthalate and second polyethyleneterephthalate having different intrinsic viscosities, wherein the yarn for a tire cord has weight average molecular weight of 90,000 g/mol or more and polydispersity index of 1.9 to 2.3, and has tenacity of 8.0 gf/d or more, or 10.00 gf/d or more.

If polyester resin chip having high intrinsic viscosity is used, due to the high viscosity, melting is difficult during a spinning process, and due to pressure increase, failure of a manufacturing device may be generated. To the contrary, if polyester resin chip having low intrinsic viscosity is used, there is a limit to the manifestation of fiber tenacity. Particularly, in case PE resin having high intrinsic viscosity is spun, viscosity may be lowered, draw ratio should be increased so as to obtain high tenacity fiber, and it is known that shrinkage rate of yarn increases and dimensional stability is deteriorated when using Hot tube technology.

Thus, the inventors confirmed through experiments that yarn for a tire cord prepared using polyethyleneterephthalate multifilament obtained by melting and spinning a resin composition comprising first polyethyleneterephthalate and second polyethyleneterephthalate having different intrinsic viscosities can secure high resin flowability even in high temperature processes such as melting, extrusion or spinning, and yet, prevent thermal decomposition of materials, thereby finally improving mechanical properties of the final product, and completed the invention.

And, as will be explained later, it was confirmed that a tire cord comprising the tire cord yarn of one embodiment not only has high level of tensile strength, but also can maintain tensile strength retention rate before and after fatigue resistance test at relatively high level.

Specifically, the tire cord yarn of one embodiment may have weight average molecular weight of 90,000 g/mol or more and polydispersity index of 1.9 to 2.3, and have tenacity of 8.00 gf/d or more, or 10.00 gf/d or more.

Particularly, tire cord yarn provided using polyethyleneterephthalate multifilament obtained by melting and spinning a resin composition comprising first polyethyleneterephthalate and second polyethyleneterephthalate having different intrinsic viscosities has relatively broad polydispersity index, and thus, broader molecular weight distribution degree, and thereby, low molecular weight may provide initial melt flowability, and high molecular weight may decrease thermal decomposition by delaying melting due to high melting point.

And, melt viscosity of the tire cord yarn may not be so high even in the low shear rate region at a temperature of 300° C. or less, and even if the shear rate increases, melt viscosity may not be significantly lowered, thus securing mechanical properties as well as sufficient formability.

More specifically, the rate of melt viscosity at a temperature of 290° C. and a shear rate of 2000/s to melt viscosity at a temperature of 290° C. and a shear rate of 50/s of the tire cord yarn may be 50% or less, or 30 to 50%.

And, the rate of melt viscosity at a temperature of 290° C. and a shear rate of 2000/s to melt viscosity at a temperature of 290° C. and a shear rate of 50/s of the resin composition may be 50% or less, or 30 to 50%.

And, the tire cord yarn may have broad polydispersity index of 1.9 to 2.3, and yet, have high weight average molecular weight of 90,000 g/mol or more, thereby realizing high tenacity of 8.00 gf/d or more, or 10.00 gf/d or more.

Meanwhile, the polyethyleneterephthalate multifilament may be obtained by melting and spinning a resin composition comprising first polyethyleneterephthalate and second polyethyleneterephthalate having different intrinsic viscosities.

The resin composition may also have melting properties equivalent to those of the tire cord. More specifically, the resin composition may have melt viscosity of 4,000 to 4,800 poise, at a temperature of 290° C. and a shear rate of 50/s, and melt viscosity of 2,800 to 3,200 poise, at a temperature of 290° C. and a shear rate of 1000/s.

Since the melt viscosity of the resin composition is not so high even in the low shear rate region at a temperature of 300° C. or less, spinning pack pressure may not be excessively increased, thus enabling stable spinning, and even if the shear rate increases, melt viscosity may not be significantly lowered, thereby securing mechanical properties as well as sufficient formability.

More specifically, a difference between melt viscosity at a temperature of 290° C. and a shear rate of 50/s and melt viscosity at a temperature of 290° C. and a shear rate of 1000/s of the resin composition may be 1,800 poise or less.

And, the resin composition may have weight average molecular weight of 90,000 g/mol or more, Z average molecular weight of 125,000 to 132,000, and polydispersity index of 2.150 to 2.300.

Since the resin composition has high Z-average molecular weight, it may have relatively broad polydispersity. Thus, the resin composition may secure initial melt flowability of low molecular weight polymer, and simultaneously, decrease thermal decomposition by delaying melting due to high melting point of high molecular weight polymer. And, since thermal decomposition may be decreased, the resin composition may have higher weight average molecular weight and high tenacity.

Meanwhile, the resin composition may comprise first polyethyleneterephthalate and second polyethyleneterephthalate having different intrinsic viscosities.

More specifically, the resin composition may comprise first polyethyleneterephthalate having intrinsic viscosity of 0.80 dl/g to 1.40 dl/g, and second polyethyleneterephthalate having intrinsic viscosity of 1.50 dl/g to 1.90 dl/g. And, the first polyethyleneterephthalate may have intrinsic viscosity of 1.00 dl/g to 1.25 dl/g, and the second polyethyleneterephthalate may have intrinsic viscosity of 1.65 dl/g to 1.75 dl/g.

Particularly, the resin composition has a specific content of the second polyethyleneterephthalate among the first polyethyleneterephthalate and second polyethyleneterephthalate, thereby preventing polymer flowability decrease, pack pressure increase, deterioration of durability of a spinning device, or decrease in intrinsic viscosity of prepared yarn, and the like, which are generated when using polyester with high molecular weight, and thus, can provide polyester yarn that secures high efficiency and economical utility, and yet, has high tenacity and high intrinsic viscosity, and a tire cord using the same.

Commonly, in case polyester having high intrinsic viscosity greater than 1.40 dl/g is used, a temperature in the preparation process should be sometimes increased to 300° C. or more, and thereby, thermal decomposition may be accelerated and the properties of first prepared yarn may be deteriorated, and thus, it was known that the use of polyester having high intrinsic viscosity or a method of mixing the same with other kinds of polyester are limited to some degree.

To the contrary, the polymer resin composition comprises two kinds of polyester having specific intrinsic viscosities, more specifically, first polyethyleneterephthalate having intrinsic viscosity of 0.80 dl/g to 1.40 dl/g, or 1.00 dl/g to 1.25 dl/g and second polyethyleneterephthalate having intrinsic viscosity of 1.50 dl/g to 1.90 dl/g, or 1.65 dl/g to 1.75 dl/g, and comprises the second polyethyleneterephthalate in the content of 10 wt % to 40 wt %, or 15 wt % to 35 wt %, or 20 to 30 wt %, thereby overcoming the limit according to the use of polyester having high intrinsic viscosity.

Particularly, the polymer resin composition comprises the above explained first and second polyester, and comprises the second polyester in the specific content, but the total intrinsic viscosity is not significantly lowered.

As explained above, the polymer resin composition may have appropriate flowability at a temperature of 300° C. or less, thereby preventing polymer flowability decrease, pack pressure increase, deterioration of durability of spinning device or intrinsic viscosity decrease of prepared yarn, and the like in the preparation process of polyester yarn. Namely, the melt viscosity of the polymer resin composition may not be so high even in the low shear rate region at a temperature of 300° C. or less, and even if shear rate increases, melt viscosity may not significantly increase, thus securing sufficient formability, and melt viscosity may not significantly decrease according to thermal decomposition of polyester.

A tire cord provided using the polymer resin composition may have relatively high weight average molecular weight, for example, weight average molecular weight of 90,000 g/mol or more, or 90,000 g/mol to 150,000 g/mol.

The tire cord yarn may have maximum draw ratio of 2.0 times or more, or 2.0 to 2.30 times, or 2.1 to 2.25 times, and tenacity of 8.00 gf/d or more or 10.00 gf/d or more, or 8.00 gf/d to 12.00 gf/d.

A manufacturing method of the tire cord is not specifically limited, and for example, it may be obtained by melting and spinning the polymer resin composition. Wherein, the polymer resin composition may be molten at a temperature range of 250° C. to 300° C., or 270° C. to 300° C., and the initial spinning speed (1st Godet Roller, G/R) of 1000 m/min to 4000 m/min, or 2000 m/min to 4000 m/min may be applied.

The tire cord yarn may be drawn 2.0 to 2.30 times, or 2.1 to 2.25 times.

The tire cord yarn of the above embodiment may comprise polyethyleneterephthalate multifilament, and total filament number of the polyethyleneterephthalate multifilament may be 100 to 1,500, and total fineness of the tire cord yarn may be 500 to 5,000 denier.

The tire cord yarn may have number of twist per unit length of 100 TPM to 600 TPM, or 200 TPM to 480 TPM.

The shape of the tire cord yarn is not specifically limited, and specifically, 1 to 3 ply yarn having total filament number of 100 to 1,500, total fineness of 500 to 5,000 denier, and twist per unit length of 100 to 600 TPM may be included.

The tire cord yarn may be used as a body ply cord of a pneumatic tire. Thereby, it can very effectively withstand the load of the entire vehicle. However, the use of the tire cord is not limited thereto, and it may be applied for other uses such as cap ply, and the like.

Meanwhile, according to another embodiment of the invention, there is provided a tire cord comprising the yarn for a tire cord.

For the details of the tire cord yarn, the above explanations are applied.

The tire cord may be manufactured from the above explained tire cord yarn, and thus, have higher tenacity and high intrinsic viscosity.

More specifically, the tire cord yarn may have draw ratio of 2.0 to 2.5 times, and tensile strength of the tire cord measured according to ASTM D885 may be 7.5 g/d or more, or 7.5 g/d to 9.9 g/d.

And, as the draw ratio of yarn included in the tire cord is higher, tensile strength of the tire cord may become higher, and for example, when the tire cord yarn has a draw ratio of 2.1 to 2.5 times, tensile strength of the tire cord according to ASTM D885 may be 8.5 g/d or more, or 8.5 g/d to 9.9 g/d.

Meanwhile, in the case of a tire cord having relatively high tenacity, if repeated compressive strain and tensile strain are applied, tensile strength may be significantly lowered, but the tire cord may have high tensile strength, and yet, maintain tensile strength retention rate before and after fatigue resistance test at relatively high level, as explained above.

More specifically, the tire cord may have tensile strength retention rate before and after fatigue resistance test of the following General Formula 1, of 62% or more, or 62% to 75%, or 62.4% to 71%.

Tensile strength retention rate before and after fatigue resistance test=Tensile strength of tire cord after fatigue resistance test/tensile strength of tire cord before fatigue resistance test  [General Formula 1]

In the General Formula 1, the tensile strength of a tire cord may be measured according to ASTM D885 standard, and the tensile strength of a tire cord after fatigue resistance test may be tensile strength of a tire cord, measured after removing rubber after the fatigue resistance test.

The Disk fatigue resistance test is evaluated according to JIS L 1017 standard, more specifically, the fatigue resistance test is conducted by applying a temperature of 100° C., 2500 rpm and tensile-compression rate of ±8.0% for 24 hours for a specimen prepared by vulcanizing the tire cord with rubber at a temperature of 160° C. and a pressure of 20 kgf for 20 minutes, using a Disk fatigue tester.

Meanwhile, the tire cord may be manufactured by steps of plying the above explained tire cord yarn to form ply yarn; and dipping the ply yarn in an adhesive solution and heat treating.

The plying step may be conducted by Z' twisting drawn yarn with total fineness of 500 to 5000 denier at a twist number of 100 to 600 TPM (twist per meter), and S' twisting 1 to 3 plies of the Z' twist yarn at 100 to 600 TPM, thus preparing ply yarn with total fineness of 500 to 15000 denier.

And, as the adhesive solution, those commonly used for manufacturing tire cord, for example, a resorcinol-formaldehyde-latex (RFL) adhesive solution may be used. And, the heat treatment process may be progressed at a temperature of 220 to 260° C. for 90 to 360 seconds, preferably at a temperature of 230 to 250° C. for 90 to 240 seconds, more preferably at a temperature of 240 to 245° C. for 90 to 120 seconds. By dipping the ply yarn in the adhesive solution and heat treating under such conditions, dimensional stability of a tire cord may be further improved, and property change may be further reduced during vulcanization of a tire.

Meanwhile, according to yet another embodiment of the invention, there is provided a tire for an automobile comprising a tire cord manufactured from the tire cord yarn.

The tire may be a pneumatic tire to which the tire cord is bonded.

Wherein, a method or conditions for bonding a tire cord to the tire may be obviously determined by a person having ordinary knowledge in the art, considering the kind, material or shape of a tire, or the kind, material or shape of a tire cord bonded thereto, and the like.

Meanwhile, according to yet another embodiment of the invention, there is provided a method for preparing the above explained yarn for a tire cord, comprising a step of melting and spinning a resin composition comprising first polyethyleneterephthalate and second polyethyleneterephthalate having different intrinsic viscosities at 200 to 300° C. to form polyethyleneterephthalate multifilament.

To the details of the tire cord yarn, the above explanations with regard to the tire cord yarn of one embodiment may be applied.

Specific conditions of the step of melting and spinning the polymer resin composition may be determined according to the properties and kind of the finally manufactured tire cord.

For example, the polymer resin composition may be molten at a temperature range of 200° C. to 300° C., or 250° C. to 300° C., and the initial spinning speed (1st Godet Roller, G/R) of 1000 m/min to 4000 m/min may be applied.

And, the manufactured tire cord may be drawn 1.5 to 3.0 times, or 2.0 to 2.2 times.

Advantageous Effects

According to this invention, there is provided yarn for a tire cord wherein melt viscosity change according to shear rate change is not so large, which has excellent formability, and yet, can realize relatively high molecular weight and tenacity.

According to this invention, there is also provided a tire for an automobile comprising the yarn for a tire cord.

According to this invention, there is also provided a method for preparing yarn for a tire cord using the polymer resin composition.

DETAILED DESCRIPTION

Hereinafter, the invention will be explained in more detail in the following Examples. However, these examples are presented only as the illustrations of the invention, and the invention is not limited thereby.

[Measurement Method]

Hereinafter, the properties of polyethyleneterephthalate chip, polymer resin composition and yarn were respectively measured as follows.

1. Measurement Method Using Capillary Rheometer

Using Rheo-tester 2000 device of Gottfert company, 100 g of chips were inserted in a barrel, and retained at 290° C. for 5 minutes, and then, passed through outlet L/D 20 mm/1 mm according to shear rate (/s), thus measuring Poise (Pa·s) viscosity value.

2. Method for Measuring Crystallinity

The crystallinity of fiber was measured by density gradient column method. A density gradient fluid was prepared using light liquid with low density and heavy liquid with high density, and using standard float with known density, the density of a fiber sample was measured and the crystallinity was measured by the following Formula.

Crystallinity (Xc)(%)=[(density of fiber sample−specific density of fiber)/(crystal density of fiber−amorphous density of fiber)]×100 crystal density of PET: 1.457 (g/cm), amorphous density of PET: 1.336 (g/cm$^2$)

3. Method for Measuring Birefringence

Birefringence of fiber was measured with polarization microscope. Using a compensator, phase difference of fiber was measured to measure birefringence.

The polarization microscope can directly measure refractive index in a parallel direction and refractive index in a vertical direction, thus measuring the difference value as birefringence.

4. Method for Measuring Molecular Weight

Number average molecular weight, weight average molecular weight, and Z-average molecular weight were measured by gel permeation chromatography (GPC). Specifically, a sample was dissolved in hexafluoroisopropanol (HFIP), and then, additionally diluted with o-chlorophenol (OCP): chloroform=1:4 (volume/volume) and the solution was filtered with 0.45 μm membrane filter, and then, injected in Stryragel HT column (10$^3$ to 10$^5$ Å) equipped in GPC device, and measured.

5. Measurement of Tenacity and Elongation

According to the method of ASTM D885, using universal testing machine (Instron Engineering Corp, Canton, Mass.), tensile strength (g/d) and elongation at break (%) of PET yarn were respectively measured (initial load: 0.05 gf/d, sample length: 250 mm, testing speed: 300 mm/min)

6. Intrinsic Viscosity (I.V.)

Intrinsic viscosity (I.V.)(dl/g) of each PET yarn was measured using capillary viscometer according to the method of ASTM D4603-96. The solvent used was a mixed solution of phenol/1,1,2,2-tetrachloroethane (60/40 wt %).

Examples 1 to 2 and Comparative Examples 1 to 2: Preparation of Polymer Resin Composition Comparative Example 1

Polyethyleneterephthalate chips having intrinsic viscosity of 1.20 dl/g were molten and extruded under conditions of a temperature of 290° C. and a shear rate of 112.40 S$^{-1}$ to prepare strand type pellets. Wherein, load by the internal pressure of the extruder was 66%.

Comparative Example 2

Polyethyleneterephthalate chips having intrinsic viscosity of 1.20 dl/g and polyethyleneterephthalate chips having intrinsic viscosity of 1.70 dl/g were mixed at a weight ratio of 50:50, molten and extruded under conditions of a temperature of 290° C. and a shear rate of 112.40 S$^{-1}$ to prepare strand type pellets. Wherein, load by the internal pressure of the extruder was 71%.

Example 1

Polyethyleneterephthalate chips having intrinsic viscosity of 1.20 dl/g and polyethyleneterephthalate chips having intrinsic viscosity of 1.70 dl/g were mixed at a weight ratio of 80:20, molten and extruded under conditions of a temperature of 290° C. and a shear rate of 112.40 S$^{-1}$ to prepare strand type pellets. Wherein, load by the internal pressure of the extruder was 69%.

Example 2

Polyethyleneterephthalate chips having intrinsic viscosity of 1.20 dl/g and polyethyleneterephthalate chips having intrinsic viscosity of 1.70 dl/g were mixed at a weight ratio of 70:30, molten and extruded under conditions of a temperature of 290° C. and a shear rate of 112.40 S$^{-1}$ to prepare strand type pellets. Wherein, load by the internal pressure of the extruder was 70%.

The details of the preparation of polymer resin compositions in Examples 1 to 2 and Comparative Examples 1 to 2 are as described in the following Table 1.

TABLE 1

| No | | Comparative Example 1 | Comparative Example 2 | Example 1 | Example 2 |
|---|---|---|---|---|---|
| Chip I.V. | 1.2 dl/g | 100 | 50 | 80 | 70 |
| content (wt %) | 1.7 dl/g | 0 | 50 | 20 | 30 |
| Ext temp. (° C.) | | 200/250/280/290/280/280/280/280/290 | | | |
| Ext L/D (mm) | | 1200/32 | | | |
| Die Nozzle L/D (mm) | | 12/4 (3 Holes) | | | |
| Load (%) | | 66 | 71 | 69 | 70 |
| Discharge speed (g/min) | | 300 | | | |
| Shear rate (s$^{-1}$) | | 112.40 | | | |

Experimental Example 1: Evaluation of the Properties of Polymer Resin Compositions of Examples 1 to 2 and Comparative Examples 1 to 2

For the polymer resin compositions used in Examples and Comparative Examples, molecular weight and melt viscosity measurement results were shown in the following Table 2.

TABLE 2

| | I.V. 1.7 dl/g content (wt %) | GPC (g/mol) | | | | Melt Viscosity @ 290° C. Poise (Pa · s) Shear rate (1/s) | | | |
|---|---|---|---|---|---|---|---|---|---|
| | | Mn | Mw | Mz | PD | 50 | 500 | 1000 | 2000 |
| Comparative Example1 | 0 | 41440 | 86643 | 121940 | 2.091 | 4,081 | 3,154 | 2,748 | 2,284 |
| Example1 | 20 | 39740 | 90507 | 129970 | 2.278 | 4,350 | 3,401 | 2,977 | 2,351 |
| Example2 | 30 | 39784 | 91105 | 131055 | 2.290 | 4,415 | 3,456 | 3,012 | 2,394 |
| Comparative Example2 | 50 | 40044 | 92810 | 134520 | 2.318 | 5,603 | 4,105 | 3,450 | 2,679 |

As confirmed in the Table 2, the polymer resin compositions of Examples 1 and 2 wherein polyethyleneterephthalate chips having intrinsic viscosity of 1.20 dl/g and polyethyleneterephthalate chips having intrinsic viscosity of 1.70 dl/g were mixed at a weight ratio 70:30 or 80:20, have polydispersity index of 2.278 to 2.290, melt viscosity at a temperature of 290° C. and a shear rate of 50/s, of 4,000 to 4,800 poise, and melt viscosity at a temperature of 290° C. and a shear rate of 1000/s, of 2,800 to 3,200 poise, wherein a difference between the melt viscosity at a temperature of 290° C. and a shear rate of 50/s and melt viscosity at a temperature of 290° C. and a shear rate of 1000/s was 1,800 poise or less.

Namely, the polymer resin compositions of Examples 1 and 2 have high polydispersity index compared to the composition of Comparative Example 1 having the equivalent level of number average molecular weight, and thus, high mechanical properties may be secured in the final product, and melt viscosity in the low shear rate region at a temperature of 300° C. or less may not be so high, and even if shear rate increase, melt viscosity may not significantly decrease, thereby securing mechanical properties as well as sufficient formability.

To the contrary, the polymer resin composition of Comparative Example wherein polyethyleneterephthalate chips having intrinsic viscosity of 1.20 dl/g were used in the content of 100 wt %, exhibits relatively low polydispersity index, and has low molecular weight, and thus, it may be difficult to secure sufficient mechanical properties in the final product.

And, in the case of the polymer resin compositions of Comparative Example 2 wherein polyethyleneterephthalate chips having intrinsic viscosity of 1.20 dl/g and polyethyleneterephthalate chips having intrinsic viscosity of 1.70 dl/g were mixed at a weight ratio 50:50, melt viscosities at a temperature of 290° C. and shear rates of 50/s and 1000/s are all greater than 3,200 poise, and thus, it does not have sufficient formability, or may cause load or failure in the manufacturing device such as an extruder.

Example 3

Polyethyleneterephthalate chips having intrinsic viscosity of 1.20 dl/g and polyethyleneterephthalate chips having intrinsic viscosity of 1.70 dl/g were mixed at a weight ratio of 90:10, and molten and extruded under conditions of a temperature of 290° C. and a shear rate of 500 to 2000 $S^{-1}$, and initial spinning speed (1st Godet Roller, G/R) of 2800 m/min was applied to wind undrawn yarn, and finally, draw 2.15 times and wind, thus preparing polyester drawn yarn. Pack pressure by discharge was 94 kgf/cm$^2$.

Example 4

Polyethyleneterephthalate chips having intrinsic viscosity of 1.20 dl/g and polyethyleneterephthalate chips having intrinsic viscosity of 1.70 dl/g were mixed at a weight ratio of 80:20, and molten and extruded under conditions of a temperature of 290° C. and a shear rate of 500 to 2000 $S^{-1}$, and initial spinning speed (1st Godet Roller, G/R) of 2800 m/min was applied to wind undrawn yarn, and finally, draw 2.15 times and wind, thus preparing polyester drawn yarn. Pack pressure by discharge was 92 kgf/cm$^2$.

Example 5

Polyethyleneterephthalate chips having intrinsic viscosity of 1.20 dl/g and polyethyleneterephthalate chips having intrinsic viscosity of 1.70 dl/g were mixed at a weight ratio of 70:30, and molten and extruded under conditions of a temperature of 290° C. and a shear rate of 500 to 2000 $S^{-1}$, and initial spinning speed (1st Godet Roller, G/R) of 2800 m/min was applied to wind undrawn yarn, and finally, draw 2.15 times and wind, thus preparing polyester drawn yarn. Pack pressure by discharge was 103 kgf/cm$^2$.

Experimental Example 2: Measurement of Properties of Undrawn Yarn for a Tire Cord The details of Examples 3 to 5 and Comparative Example 3 were respectively described in the following Table 3, and the properties of each obtained undrawn yarn were described in the following Table 4.

TABLE 3

| Conditions | I.V. 1.7 dl/g chip wt % | I.V. 1.20 dl/g chip wt % | Spinning temperature ° C. | Spinning speed m/min | Pack pressure kgf/cm$^2$ | Maximum draw ratio D/R |
|---|---|---|---|---|---|---|
| Example 3 | 10 | 90 | 295 | 2800 | 94 | x2.15 |
| Example 4 | 20 | 80 | | | 92 | x2.2 |
| Example 5 | 30 | 70 | | | 103 | x2.13 |
| Comparative Example 3 | 0 | 100 | | | 92 | x2.15 |

Example 3 to 5 and Comparative Example 3: Preparation of Yarn for a Tire Cord

Comparative Example 3

Polyethyleneterephthalate chips having intrinsic viscosity of 1.20 dl/g were molten and extruded under conditions of a temperature of 290° C. and a shear rate of 500 to 2000 $S^{-1}$, and initial spinning speed (1st Godet Roller, G/R) of 2800 m/min was applied to wind undrawn yarn, and finally, draw 2.15 times and wind, thus preparing polyester drawn yarn. Pack pressure by discharge was 92 kgf/cm$^2$.

total fineness is 1000 De., and the fineness of monofilament is 4 De. (applying spinneret L/D 2.1/0.7, 250H)

TABLE 4

| Conditions | Intrinsic viscosity of yarn dl/g | Tenacity of yarn gf/d | Elongation of yarn % | Crystallinity of yarn % |
|---|---|---|---|---|
| Example 3 | 1.025 | 2.81 | 158.27 | 13.1 |
| Example 4 | 1.124 | 2.92 | 151.62 | 13.4 |

TABLE 4-continued

| Conditions | Intrinsic viscosity of yarn dl/g | Tenacity of yarn gf/d | Elongation of yarn % | Crystallinity of yarn % |
|---|---|---|---|---|
| Example 5 | 1.081 | 2.92 | 152.96 | 13.1 |
| Comparative Example 3 | 0.951 | 2.79 | 163.92 | 12.6 |

Tensile strength and elongation at break of yarn were measured under conditions of initial load 0.05 fg/de, sample length 250 mm and tensile speed 300 mm/min, according to ASTM D885, using universal testing machine of Instron.

As shown in the Tables 3 and 4, it was confirmed that in Examples 3 to 4, compared to Comparative Example 3, similar pack pressure was exhibited, and in Examples 3 to 5, intrinsic viscosity of prepared yarn significantly increased compared to Comparative Example, and thus, tenacity and crystallinity of yarn significantly increased.

Experimental Example 3: Measurement of Properties of Drawn Yarn for a Tire Cord

The details of Examples 3 to 5 and Comparative Example 3 were described in the following Table 5, and the properties of each obtained drawn yarn were described in the following Table 6.

TABLE 5

| Conditions | draw ratio D/R | Winder speed m/min | Tenacity of yarn gf/d | Elongation of yarn % | Mw g/mol | Polydispersity index — | birefringence Δn | Crystallinity % |
|---|---|---|---|---|---|---|---|---|
| Example 3 | x2.0 | 5600 | 8.51 | 13.32 | 92371 | 2.0250 | 0.2095 | 50.1 |
|  | X2.15 | 6020 | 10.12 | 10.51 | 93012 | 1.9755 | 0.2128 | 49.9 |
| Example 4 | x2.0 | 5600 | 8.83 | 13.01 | 94145 | 2.0008 | 0.2120 | 50.3 |
|  | x2.2 | 6160 | 11.27 | 10.11 | 94971 | 1.9638 | 0.2155 | 49.8 |
| Example 5 | x2.0 | 5600 | 8.96 | 12.97 | 93618 | 2.0160 | 0.2160 | 50.1 |
|  | x2.13 | 5960 | 10.31 | 10.25 | 93914 | 1.9824 | 0.2183 | 49.8 |
| Comparative Example 3 | x2.0 | 5600 | 7.91 | 13.22 | 88754 | 2.0320 | 0.2093 | 50.3 |
|  | x2.15 | 6020 | 9.73 | 10.13 | 89152 | 1.9995 | 0.2115 | 50.1 |

As shown in the Table 5, the drawn yarn obtained in Example 4 exhibited maximum draw ratio up to 2.2 times, winder speed up to 6160 m/min, and tenacity up to about 11.3 fg/d, and thus, it can be seen that compared to tenacity of 9.73 gf/d at maximum draw ratio of 2.15 times in Comparative Example 3, tenacity improved 1.5 gf/d or more And, as results of analyzing yarn of Comparative Example 3 and Examples 3 to 5 at draw ratio of 2.0 times, it was confirmed that in Examples 3 to 5, compared to Comparative Example 3, crystallinity is similar, but degree of orientation of birefringence and molecular weight increase, and molecular weight distribution is narrow.

Namely, it was confirmed that the yarn of Examples 3 to 5 can be subjected to a melting process at the same shear rate as in Comparative Example 3, and the rate of thermal decomposition significantly decreases, and thus, intrinsic viscosity of the final yarn is relatively high, and tenacity is also high.

Example 6 to 8 and Comparative Example 4: Manufacture of Tire Cord

Each drawn yarn of Examples 3 to 5 and Comparative Example 3 was Z twisted at predetermined total fineness and twist per unit length (TPM), and 2 strands of the yarn were plied to S twist yarn with the same twist multiplier, and dipped in a RFL adhesive solution, and then, dried and heat treated to prepare a PET tire cord.

Wherein, drawn yarn used, fineness of drawn yarn, twist multiplier (TM) and cord heat treatment conditions are shown in the following Table 6, and the composition of the RFL adhesive solution and drying conditions were in accordance with common PET tire cord manufacturing conditions.

TABLE 6

| Preparation of cord | Drawn yarn used | Fineness of drawn yarn (denier) | Twist per meter (TPM) | Ply | Cord heat treatment conditions |
|---|---|---|---|---|---|
| Example 6 | Example 3 | 1000 | 430 | 2 | 240~245° C., 90 sec or more |
| Example 7 | Example 4 | 1000 | 430 | 2 | 240~245° C., 90 sec or more |
| Example 8 | Example 5 | 1000 | 430 | 2 | 240~245° C., 90 sec or more |
| Comparative Example 4 | Comparative Example 3 | 1000 | 430 | 2 | 240~245° C., 90 sec or more |

Experimental Example 4: Measurement of Properties of Tire Cord

For each tire cord of Examples 6 to 8 and Comparative Example 4, properties were measured as follows, and the measured properties were shown in the following Table 7.

1) Tensile Strength (g/d)

Tenacity of cord was measured using universal testing machine according to ASTM D885 standard.

2) Fatigue Resistance (%)

Each tire cord of Examples 6 to 8 and Comparative Example 4 were vulcanized with rubber under conditions of a temperature of 160° C. and a pressure of 20 kgf for 20 minutes to prepare a specimen. And, for the specimen, a temperature of 100° C., 2500 rpm and ±8.0% tensile-compression rate were applied using Disk fatigue tester (manufacturing company: UESHIMA, model name: Belt tester FT-610) to alternatively apply repeated compressive strain and tensile strain for 24 hours. And then, the rubber was removed from the specimen, and tensile strength after fatigue resistance test was measured by the same method as the above method, and based thereon, tensile strength retention rate (%) before and after fatigue resistance test was calculated

TABLE 7

| Properties of cord Unit | Draw ratio (D/R) | Tensile strength (g/d) | Tensile strength after fatigue resistance test (g/d) | Tensile strength retention rate before and after fatigue resistance test (%) |
|---|---|---|---|---|
| Example 6 | X2.0 | 7.66 | 5.37 | 70.1 |
| | X2.15 | 8.80 | 5.55 | 63.1 |
| Example 7 | X2.0 | 7.95 | 5.55 | 69.8 |
| | X2.2 | 9.61 | 6.04 | 62.8 |
| Example 8 | X2.0 | 8.06 | 5.59 | 69.3 |
| | X2.13 | 8.82 | 5.50 | 62.4 |
| Comparative Example 4 | X2.0 | 7.12 | 4.95 | 69.5 |
| | X2.15 | 8.27 | 5.15 | 62.3 |

As shown in the Table 7, it was confirmed that the tire cords of Examples 6 to 8 have tensile strength of 7.5 g/d or more in case the yarn of Examples 3 to 5 having draw ratio of 2.0 or more is used, and particularly, have tensile strength of 8.5 g/d or more in case yarn having draw ratio of 2.1 or more is used.

It was also confirmed that, in the case of tire cords having relatively high tenacity, tensile strength significantly decreases if repeated compressive strain and tensile strain are applied, but the tire cords of Examples 6 to 8 have high tensile strength as explained above, and yet, compared to Comparative Example 4 having relatively low tensile strength, have equivalent or more excellent tensile strength retention rate before and after fatigue resistance test.

What is claimed is:

1. Yarn for a tire cord comprising
polyethyleneterephthalate multifilament obtained by melting and spinning a resin composition comprising first polyethyleneterephthalate and second polyethyleneterephthalate having different intrinsic viscosities,
wherein the yarn has weight average molecular weight of 90,000 g/mol or more and polydispersity index of 1.9 to 2.3, and has tenacity of 8.0 gf/d or more,
wherein the resin composition comprises first polyethyleneterephthalate having intrinsic viscosity of 0.80 dl/g to 1.40 dl/g, and second polyethyleneterephthalate having intrinsic viscosity of 1.50 dl/g to 1.90 dl/g, and
wherein the resin composition comprises the second polyethyleneterephthalate in the content of 10 wt % to 40 wt %.

2. The yarn for a tire cord according to claim 1, wherein the rate of melt viscosity at a temperature of 290° C. and a shear rate of 2000/s to melt viscosity at a temperature of 290° C. and a shear rate of 50/s of the resin composition is 50% or less, or
the rate of melt viscosity at a temperature of 290° C. and a shear rate of 2000/s to melt viscosity at a temperature of 290° C. and a shear rate of 50/s of the yarn for a tire cord is 50% or less.

3. The yarn for a tire cord according to claim 1, wherein a difference between melt viscosity at a temperature of 290° C. and a shear rate of 50/s and melt viscosity at a temperature of 290° C. and a shear rate of 1000/s of the resin composition is 1,800 poise or less.

4. The yarn for a tire cord according to claim 1, wherein the resin composition has melt viscosity of 4,000 to 4,800 poise, at a temperature of 290° C. and a shear rate of 50/s, and
has melt viscosity of 2,800 to 3,200 poise, at a temperature of 290° C. and a shear rate of 1000/s.

5. The yarn for a tire cord according to claim 1, wherein the resin composition has weight average molecular weight of 90,000 g/mol or more, Z average molecular weight of 125,000 to 132,000, and polydispersity index of 2.150 to 2.300.

6. The yarn for a tire cord according to claim 1, wherein a intrinsic viscosity difference between the first polyethyleneterephthalate and second polyethyleneterephthalate is 0.3 to 0.5 dl/g.

7. The yarn for a tire cord according to claim 1, wherein the first polyethyleneterephthalate has intrinsic viscosity of 1.00 dl/g to 1.25 dl/g, and
the second polyethyleneterephthalate has intrinsic viscosity of 1.65 dl/g to 1.75 dl/g.

8. The yarn for a tire cord according to claim 1, wherein total filament number of the polyethyleneterephthalate multifilament is 100 to 1,500, and
total fineness of the yarn for a tire cord is 500 to 5,000 denier.

9. The yarn for a tire cord according to claim 1, wherein the yarn for a tire cord has maximum draw ratio of 2.0 times or more.

10. A tire cord comprising the yarn for a tire cord of claim 1.

11. The tire cord according to claim 10, wherein the yarn for a tire cord has draw ratio of 2.0 to 2.5 times, and
tensile strength of the tire cord according to ASTM D885 standard is 7.5 g/d or more.

12. The tire cord according to claim 10, wherein the yarn for a tire cord has draw ratio of 2.1 to 2.5 times, and
tensile strength of the tire cord according to ASTM D885 standard is 8.5 g/d or more.

13. The tire cord according to claim 10, wherein the tire cord has tensile strength retention rate of the following General Formula 1, before and after fatigue resistance test, of 62% or more:

Tensile strength retention rate before and after fatigue resistance test=Tensile strength of tire cord after fatigue resistance test/tensile strength of tire cord before fatigue resistance test   [General Formula1]

in the General Formula 1,
the tensile strength of tire cord is measured according to ASTM D885 standard,
the Disk fatigue resistance test is evaluated according to JIS L 1017 standard,
the tensile strength of a tire cord after fatigue resistance test is tensile strength of a tire cord, measured after removing rubber after the fatigue resistance test, and
the fatigue resistance test is conducted by applying a temperature of 100° C., 2500 rpm and tensile-compression rate of +8.0% for 24 hours for a specimen prepared by vulcanizing the tire cord with rubber at a temperature of 160° C. and a pressure of 20 kgf for 20 minutes, using a Disk fatigue tester.

14. A method for preparing the yarn for a tire cord of claim 1, comprising a step of melting and spinning a resin composition comprising first polyethyleneterephthalate and second polyethyleneterephthalate having different intrinsic viscosities at 200 to 300° C., to form polyethyleneterephthalate multifilament,
wherein the resin composition comprises first polyethyleneterephthalate having intrinsic viscosity of 0.80 dl/g to 1.40 dl/g, and second polyethyleneterephthalate having intrinsic viscosity of 1.50 dl/g to 1.90 dl/g, and wherein the resin composition comprises the second polyethyleneterephthalate in the content of 10 wt % to 40 wt %.

* * * * *